(12) United States Patent
Gonzalez

(10) Patent No.: US 12,429,839 B2
(45) Date of Patent: Sep. 30, 2025

(54) POWER DISTRIBUTION UNIT FOR CRYPTO MINING APPLICATIONS

(71) Applicant: Electronic Power Design, Inc., Houston, TX (US)

(72) Inventor: Felix Guadalupe Gonzalez, Houston, TX (US)

(73) Assignee: Electronic Power Design, Inc., Houston, TX (US)

( * ) Notice: Subject to any disclaimer, the term of this patent is extended or adjusted under 35 U.S.C. 154(b) by 275 days.

(21) Appl. No.: 17/994,091

(22) Filed: Nov. 25, 2022

(65) Prior Publication Data
US 2023/0161311 A1    May 25, 2023

Related U.S. Application Data

(60) Provisional application No. 63/283,093, filed on Nov. 24, 2021.

(51) Int. Cl.
*G05B 19/042* (2006.01)
*G06F 1/28* (2006.01)

(52) U.S. Cl.
CPC ............. *G05B 19/042* (2013.01); *G06F 1/28* (2013.01); *G05B 2219/2639* (2013.01)

(58) Field of Classification Search
CPC .. G05B 19/042; G05B 2210/2639; G06F 1/28
See application file for complete search history.

(56) References Cited

U.S. PATENT DOCUMENTS

| | | | |
|---|---|---|---|
| 10,386,903 B1 * | 8/2019 | Moen | G06F 1/305 |
| 2022/0013994 A1 * | 1/2022 | French | G06F 1/26 |

* cited by examiner

*Primary Examiner* — Gary Collins
(74) *Attorney, Agent, or Firm* — G. Michael Roebuck, PC

(57) ABSTRACT

A compact three-phase power distribution in new power usage environments is presented including but not limited to a three phase power source; a three phase alternating current input port configured to receive three phase power from the three phase power source; a first, second and third input terminal on the three phase alternating current input port configured to receive a first, second and third phase of power from the three phase power source; a first output terminal configured to distribute the first phase of power from the three phase power source; a second output terminal configured to distribute the second phase of power from the three phase power source; and a third output terminal configured to distribute the third phase of power from the three phase power source.

10 Claims, 17 Drawing Sheets

DETAIL A

SECTION C-C

SECTION D-D

DETAIL E

DETAIL F

POWER DISTRIBUTION UNIT FOR CRYPTO MINING APPLICATIONS

CROSS REFERENCE TO RELATED APPLICATIONS

This patent application claims priority from U.S. provisional patent application Ser. No. 63/283,093 filed on 24 Nov. 2021, by Janik, entitled "Three Phase Electrical 6 Outlet Power Strip" which is hereby incorporated by reference in its entirety.

BACKGROUND OF THE INVENTION

There is a need for compact power distribution in new power usage environments including but not limit to mining of crypto currencies such as BITCOIN™.

FIELD OF THE INVENTION

Compact three-phase power distribution in new power usage environments.

BRIEF DESCRIPTION OF THE DRAWINGS

The drawings presented herein are for illustrative purposes only and do not limit the scope of the claims. Rather, the drawings are intended to help enable one having ordinary skill in the art to make and use the claimed inventions.

SUMMARY OF THE INVENTION

Figure 1:
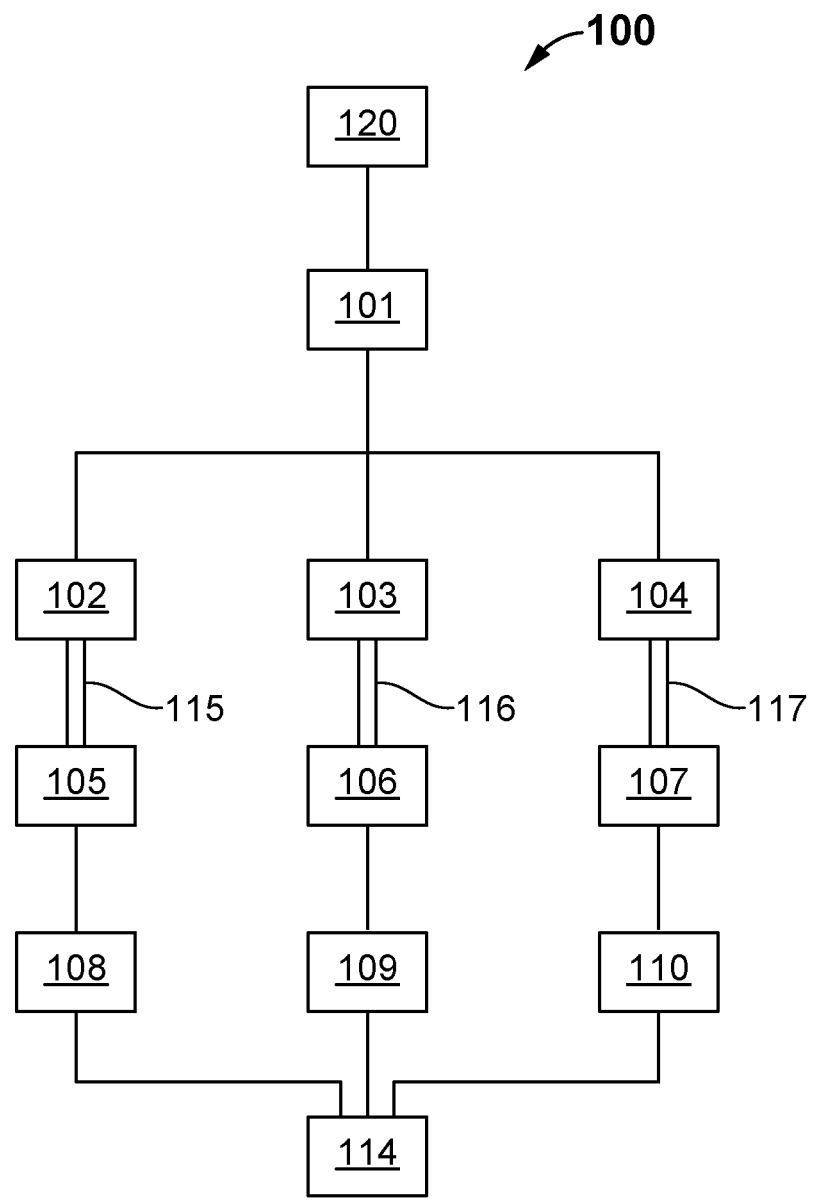
FIG. 1 is schematic depiction an particular illustrative embodiment of the invention.

A Power Distribution Unit (PDU) for Crypto Mining Applications in a compact three-phase power distribution apparatus is disclosed.

DETAILED DESCRIPTION

A detailed description a particular illustrative embodiment of the invention will now be provided. The purpose of this detailed description, which includes the drawings, is to satisfy the statutory requirements of 35 U.S.C. § 112. For example, the detailed description includes a description of inventions defined by the claims and sufficient information that would enable a person having ordinary skill in the art to make and use the inventions. In the figures, like elements are generally indicated by like reference numerals regardless of the view or figure in which the elements appear. The figures are intended to assist the description and to provide a visual representation of certain aspects of the subject matter described herein. The figures are drawn to scale, the figures do not show all the structural details, nor do they limit the scope of the claims.

Certain specific embodiments of methods, structures, elements, and parts are described below, which are by no means an exclusive description of the inventions. Other specific embodiments, including those referenced in the drawings, are encompassed by this application and any patent that issues therefrom.

A power supply is an electrical device that supplies electric power to an electrical load. The main purpose of a power supply is to convert electric current from a source to the correct voltage, current, and frequency to power the load. As a result, power supplies are sometimes referred to as electric power converters. Some power supplies are separate standalone pieces of equipment, while others are built into the load appliances that they power. Examples of the latter include power supplies found in desktop computers and consumer electronics devices. Other functions that power supplies may perform include limiting the current drawn by the load to safe levels, shutting off the current in the event of an electrical fault, power conditioning to prevent electronic noise or voltage surges on the input from reaching the load, power-factor correction, and storing energy so it can continue to power the load in the event of a temporary interruption in the source power.

In a particular illustrative embodiment of the invention, a power distribution unit is provided constructed of galvanized steel. In a particular illustrative embodiment of the invention a Power Distribution Unit (PDU) for Crypto Mining Applications is disclosed. In a particular illustrative embodiment of the invention each power strip section provides six (6) 240 VAC outlets. The incoming power is three phase power, led to a 45 AT three-pole breaker. Cabling distributes 240 VAC single phase power to the outlets.

In addition to this, the power strip is equipped with a 20 A 1 phase miniature circuit breaker for each outlet. Cable is provided to the line side of the 45 AT breakers on each power strip. Each cable has a 3 foot service loop for each power strip. Each busduct is constructed of galvanized steel, with a width and depth as set out in the attached drawings. Final height of the raceway is to be determined. Holes in the side of the raceway shall be designed so that the power strips securely mount to the raceway while sealing the power cable in.

The power distribution unit is constructed of galvanized power strip section is constructed of cold rolled steel and has six (6) 240 VAC outlets. The incoming power is 415V three phase power, led to a 45 AT three pole breaker. Cabling will then distribute 240 VAC single phase power to the outlets. In addition to this, the power strip shall be equipped with a 20 A 1 PH miniature circuit breaker for each outlet. The power strip is furnished with hinges to attach to upper shelf of the mining cabinet. Height of the power strip shall be no greater than four (4) inches. The length of the power strip shall not exceed 36 inches.

A steel raceway for 415V three-phase power cables is provided. Cable included from the terminal block at the base of the raceway to the line side of the 45 AT breakers on each power strip. Cables run from the terminal block, make a service loop in the raceway, and then connect to the 45 AT breaker in each power strip, for a total of seven (7) cables enclosed in each raceway. Each cable will have a 3 foot service loop for each power strip. In addition to this, EPD shall also provide cables to connect each feeder breaker on the MDP to each raceway terminal block. This consists of one (1) 480+VAC 300+A rated cable per raceway.

Each raceway shall be constructed of cold rolled steel, with a width and depth no greater than 6"×6" respectively. Final height of the raceway is to be determined. Holes in the side of the raceway shall be designed so that the power strips securely mount to the raceway while sealing the power cable in. The cables will be secured at the junction from the power strip to the raceway using a strain relief design.

Turning now to FIG. 1, FIG. 1 is a schematic depiction of a particular illustrative embodiment of the invention. As shown in FIG. 1, in a particular illustrative embodiment of the invention 100, a power distribution system for crypto mining applications is disclosed the system as shown in FIG. 1, provides a three phase power source 120; a three phase alternating current input port configured to receive three phase power from the three phase power source 101; a first input terminal on the three phase alternating current input port configured to receive a first phase of power from the three phase power source 102; a second input terminal on the three phase alternating current input port configured to receive a second phase of power from the three phase power source 103; a third input terminal on the three phase alternating current input port configured to receive a third phase of power from the three phase power source 104; a first output terminal configured to distribute the first phase of power from the three phase power source 105; a second output terminal configured to distribute the second phase of power from the three phase power source 106; and a third output terminal configured to distribute the third phase of power from the three phase power source 107. In a particular illustrative embodiment the three phase power from the three phase power source is 240 volts alternating current. In a particular illustrative embodiment the three phase power from the three phase power source is 480 volts alternating current. In a particular illustrative embodiment of the invention the system provides a first 20-ampere single phase circuit breaker on the first output terminal 108; a second 20-ampere single phase circuit breaker on the second output terminal 109; and a third 20-ampere single phase circuit breaker on the third output terminal 110; a first cable attached to the first output terminal for distributing the first phase of the three phase input power 111; a second cable attached to the first output terminal for distributing the second phase of the three phase input power 112; and a third cable attached to the first output terminal for distributing the third phase of the three phase input power 113; a three phase 45 ampere breaker electrically connected to the three phase power input power 114.

In a particular illustrative embodiment of the invention the system further provides a first bus bar configured to connect the first phase power input terminal and the first phase output terminal 115; a second bus bar configured to connect the first phase power input terminal and the second phase output terminal 116; and a third bus bar configured to connect the first phase power input terminal and the third phase output terminal 117; and a housing 118, the housing containing the power distribution system for crypto mining application. In a particular illustrative embodiment of the invention the first bus bar is a flat metal strip. In a particular illustrative embodiment of the invention the three phase power from the three phase power source is 415 volts alternating current.

Figure 2:
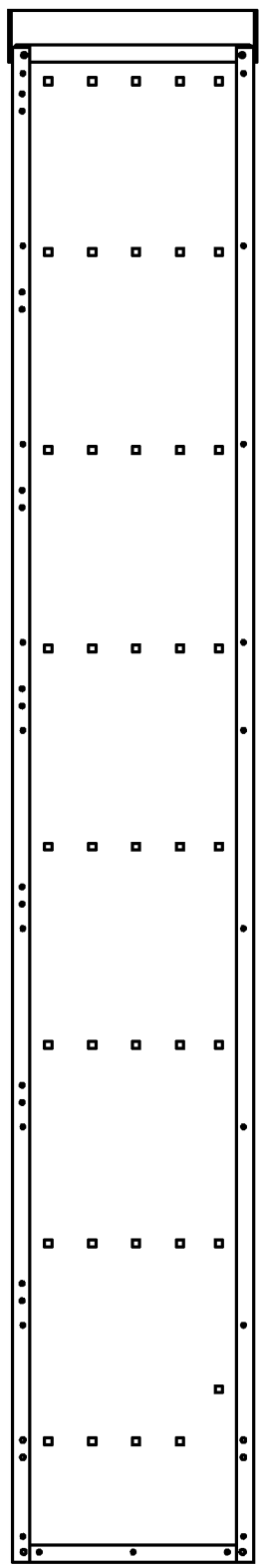
FIG. 2 is a schematic depiction of a front view of a particular illustrative embodiment of the invention.

The FIGS. 2-14 components are identified with reference numerals, wherein the reference numerals are labeled on the figures in a chart on the figure. Turning now to FIG. 2, FIG. 2 is a schematic depiction of a front view of an assembled housing or cable box 33 having a cable box top 34 and a cable box bottom 35 and internal electronics, further described below, in a particular illustrative embodiment of the invention. A lifting bracket 30 is shown attached to the top of the cable box.

Figure 3:
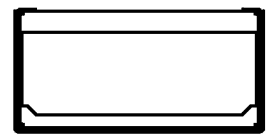
FIG. 3 is a schematic depiction of a bottom view of a particular illustrative embodiment of the invention.
Figure 4:
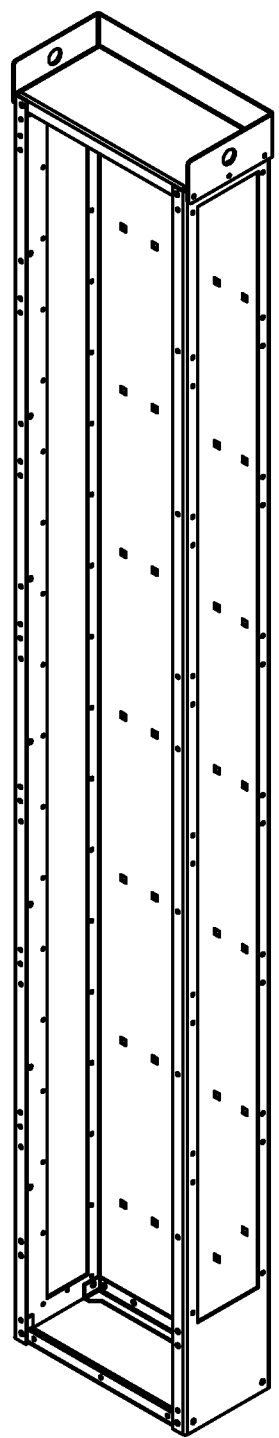
FIG. 4 is a schematic depiction of a perspective view a frame particular illustrative embodiment of the invention.
Figure 5:
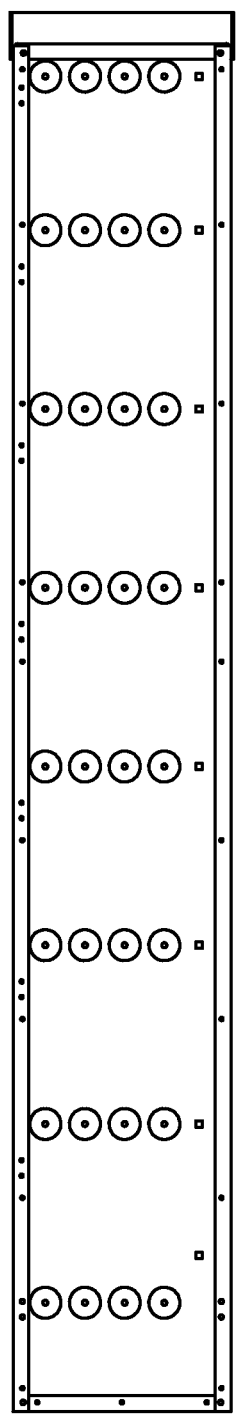
FIG. 5 is a schematic depiction of an interior view showing insulators in a particular illustrative embodiment of the invention.
Figure 6:
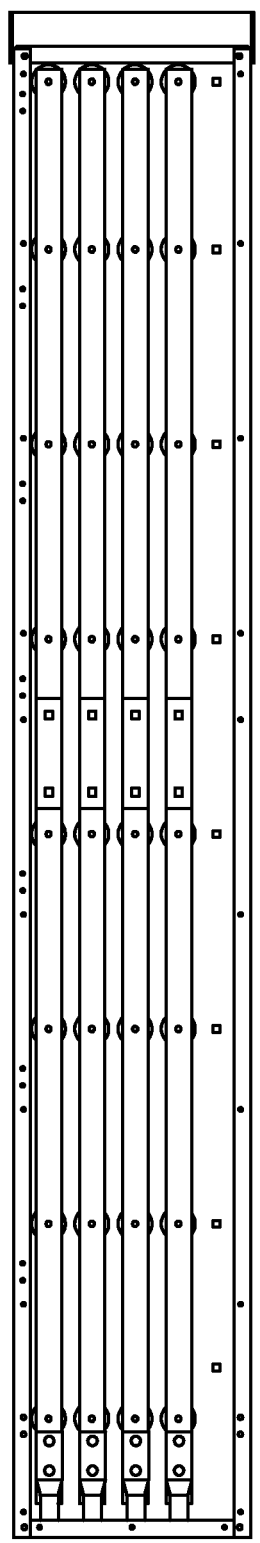
FIG. 6 is a schematic depiction of an interior view shown 3 phase power bus bars and a ground bar in a particular illustrative embodiment of the invention.
Figure 7:
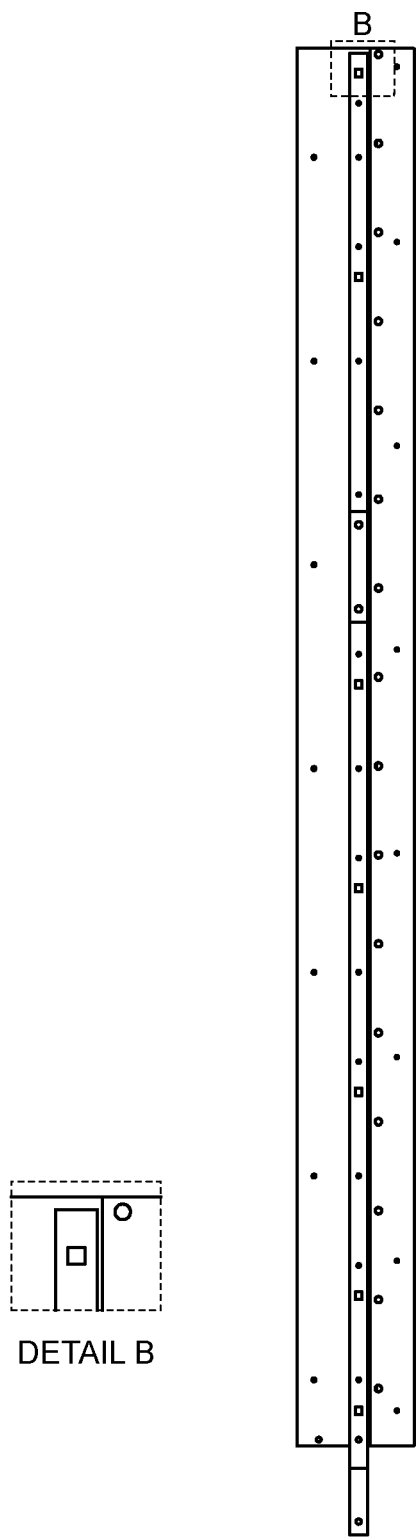
FIG. 7 is a schematic depiction of a ground bus bar particular illustrative embodiment of the invention.

Turning now to. FIG. 3, FIG. 3 is a schematic depiction of a bottom view of a particular illustrative embodiment of the invention showing a bottom view to the cable box 33. As shown in FIG. 3, a cable box bottom 35 and a back bottom frame 28 are provided. The end user connects 3 phase power cable to the bottom, shown in more detail below. The three phase power is four cables, one for phase A, one for phase B, one for phase C and a neutral. FIG. 4 is a schematic depiction of a perspective view a frame inside of the cable box in a particular illustrative embodiment of the invention. FIG. 5 is a schematic depiction of an interior view showing insulators 6 in a particular illustrative embodiment of the invention. the insulators hold the power bus bars off of the cable box. FIG. 6 is a schematic depiction of an interior view shown 3 phase power bus bars and a ground bar in a particular illustrative embodiment of the invention 3 is a bottom phase bar, 1.5" W, 8 is a top phase bar, 1.5" W, 9 is a middle phase bar, 1.5" W and 18 is a CRIMP for attached the three phase power to the bottom of the cable box and associated power bus and neutral bars.

Figure 8:
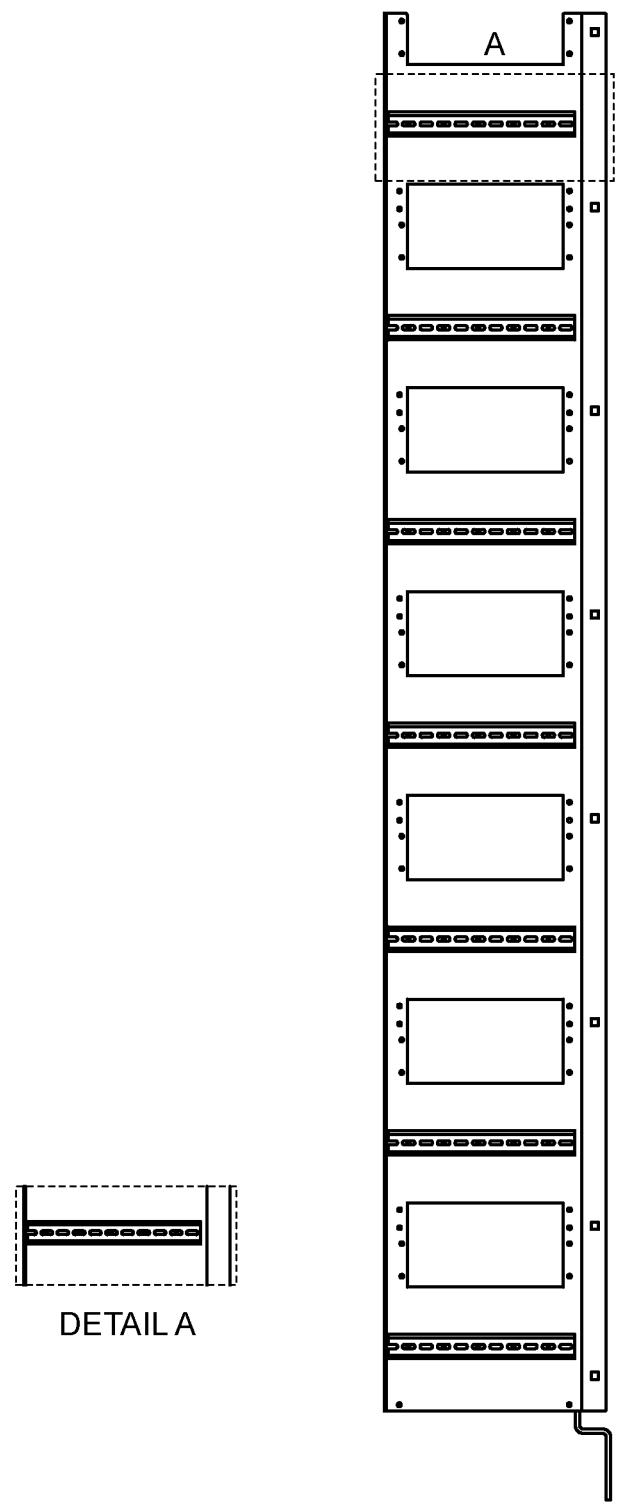
FIG. 8 is a schematic depiction of a front panel of a housing in a particular illustrative embodiment of the invention.
Figure 9:
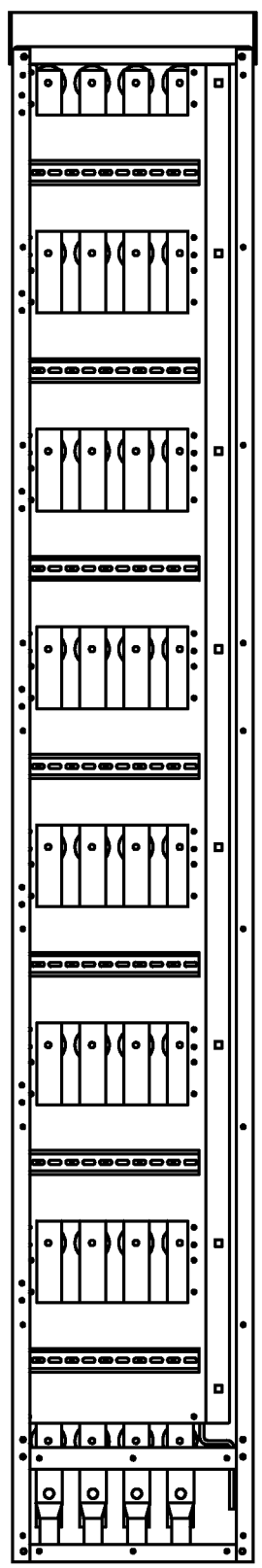
FIG. 9 is a schematic depiction of a front panel installed and covering the 3 phase power bus bars and the ground bar in a particular illustrative embodiment of the invention.
Figure 10:
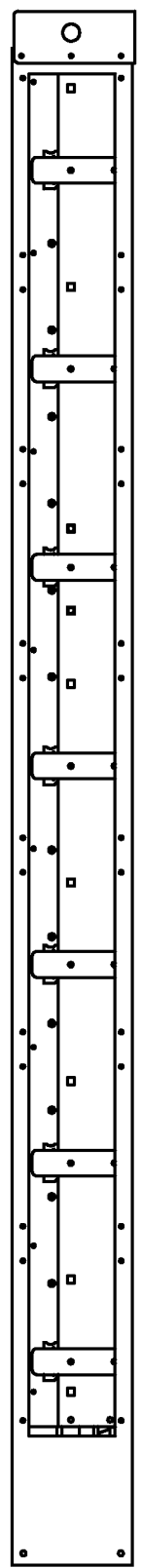
FIG. 10 is a schematic depiction of a right view of a particular illustrative embodiment of the invention.

Turning now to FIGS. 7-10, FIG. 7 is a schematic depiction of a ground bus bar particular illustrative embodiment of the invention. FIG. 8 is a schematic depiction of a front panel of a housing in a particular illustrative embodiment of the invention. FIG. 9 is a schematic depiction of a front panel installed and covering the 3 phase power bus bars and the ground bar in a particular illustrative embodiment of the invention. FIG. 10 is a schematic depiction of a right view of a particular illustrative embodiment of the invention. 6 is a breaker pan, 7 is a bottom gnd bar, 1.00" w, 12 is a rail end plate, 19 is a top gnd bar, 1.00" w, 20 is a middle gnd Bar, 1.00" w and 23 is a closing channel.

Figure 11:
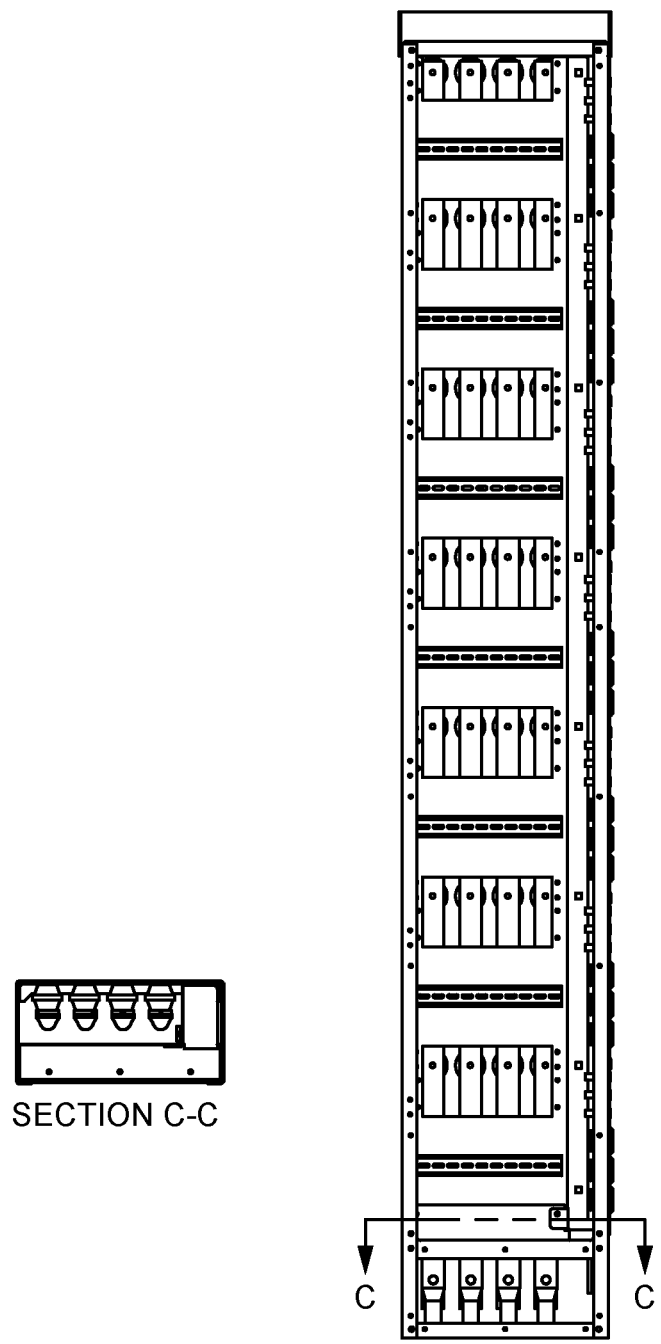
FIG. 11 is a schematic depiction of a front view of a particular illustrative embodiment of the invention.
Figure 12:
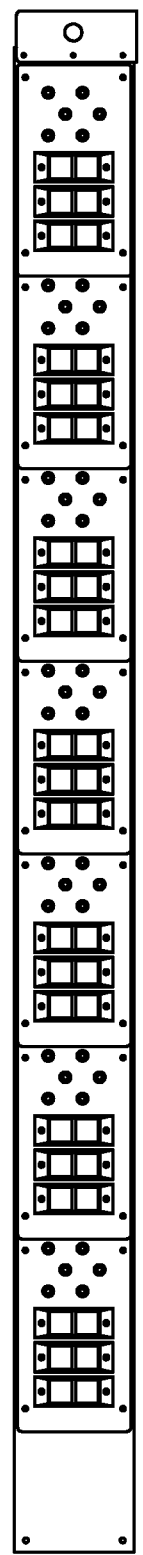
FIG. 12 is a schematic depiction of side view of a particular illustrative embodiment of the invention.

Turning now to FIG. 11 and FIG. 12, FIG. 11 is a schematic depiction of a front view of a particular illustrative embodiment of the invention. FIG. 12 is a schematic depiction of side view of a particular illustrative embodiment of the invention. As shown in FIG. 11 and FIG. 12, 21 is a plug side cover, 22 is a plug top side cover, 24 is a bottom pan, 25 is a bottom isolation barrier, 16 GA and 29 is a plug top side cover.

Figure 13:
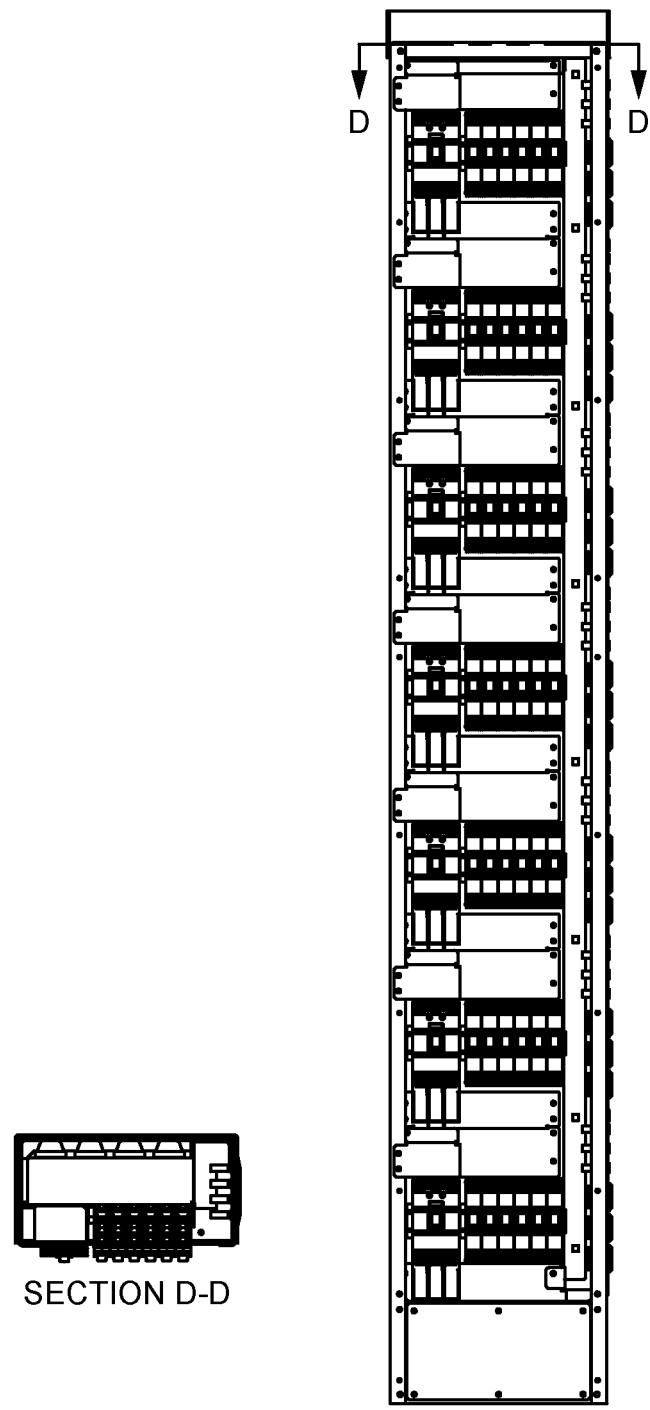
FIG. 13 is a schematic depiction of a front view of a particular illustrative embodiment of the invention.
Figure 14:
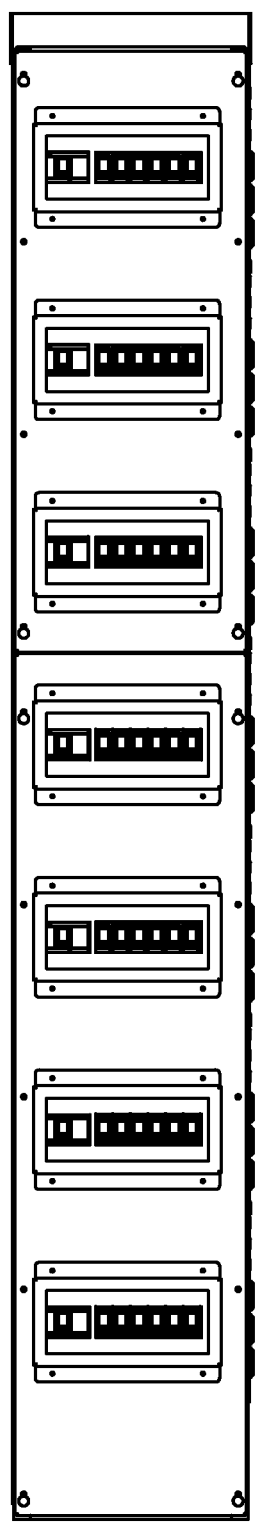
FIG. 14 is a schematic depiction of a front view of a particular illustrative embodiment of the invention.

Turning now to FIGS. 13 and 14, FIG. 13 is a schematic depiction of a front view of a particular illustrative embodiment of the invention. As shown in FIG. 13, 14 is a breaker cable cover, 14 is a breaker bottom cover, 15 is a breaker top cover, 27 bottom isolation barrier, 16 ga, and 32 is a breaker bottom cover. FIG. 14 is a schematic depiction of a front view of a particular illustrative embodiment of the invention. As shown in FIG. 14, 16 is a front bottom cover, 14 ga, 17 is a front top cover, 14 ga and 31 is a breaker cover, 16 ga.

Figure 15:
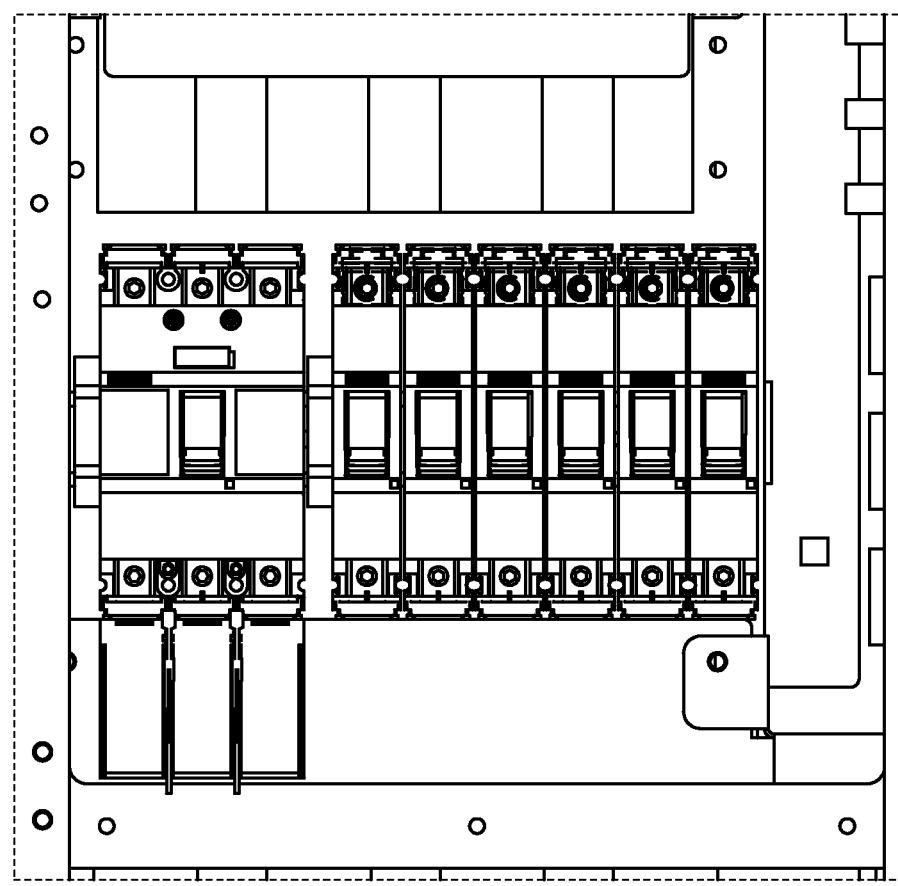
FIG. 15 is a schematic depiction of a front view of a particular illustrative embodiment of the invention.
Figure 16:
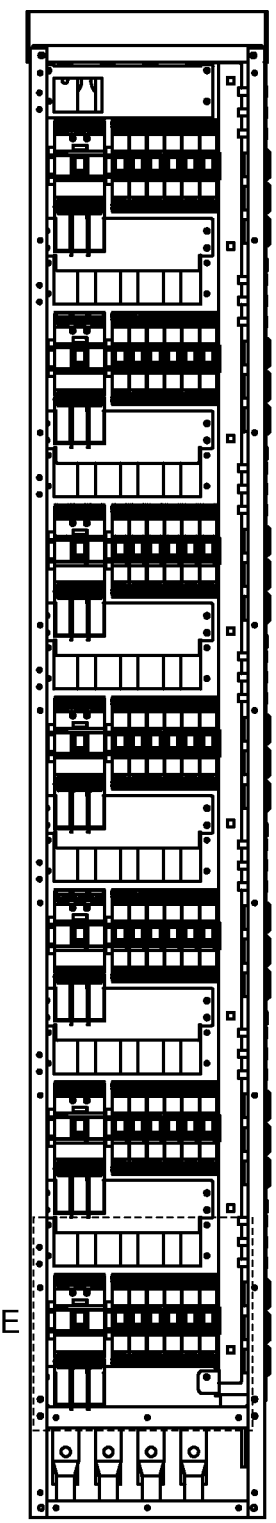
FIG. 16 is a schematic depiction of a front view of a particular illustrative embodiment of the invention.
Figure 17:
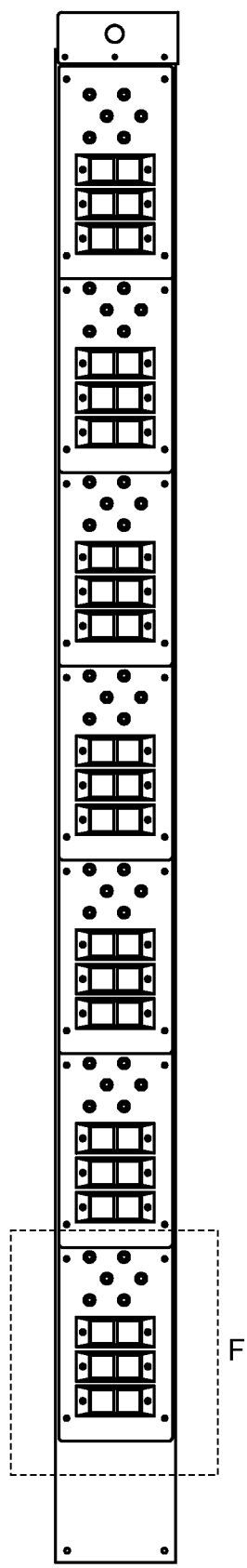
FIG. 17 is a schematic depiction of a front view of a particular illustrative embodiment of the invention.
Figure 18:
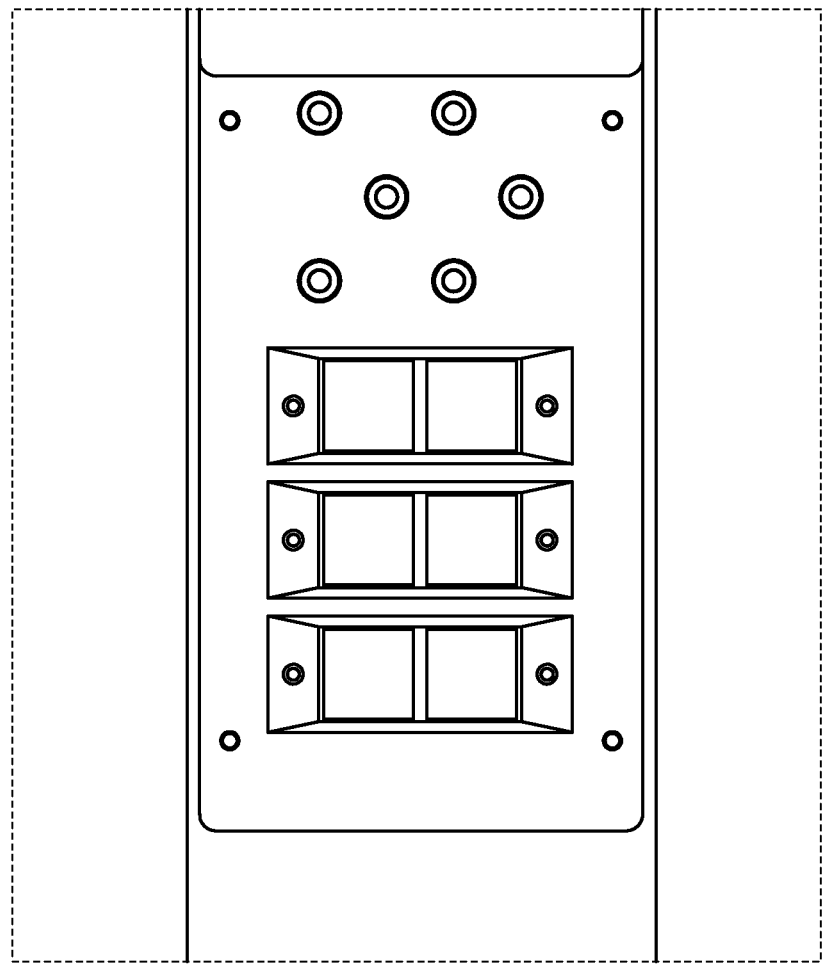
FIG. 18 is a schematic depiction of a front view of a particular illustrative embodiment of the invention.

Turning now to FIGS. 15, 16, 17 and 18. As shown in FIG. 15 10 is a wire conn, 3 va4/5, 3 phase, 37 is a wire con w/ tap, 3 va4/5 125 a, 38 is, 1-pole, 125 a 50 ka @277v, 39 is a phase barriers, 3 va4/5 125, 40 is a 3-pole, 41 is an insulating plate, 3-p, 3 va4/5, 42 7 is a nut keeper kit, 3 va4/5, 43 is an outlet panel mount frame, 44 led pilot light and 45 is a universal outlet, 250 a, ivory.

Each of the appended claims defines a separate invention which, for infringement purposes, is recognized as including equivalents of the various elements or limitations specified in the claims. Depending on the context, all references below to the "invention" may in some cases refer to certain specific embodiments only. In other cases, it will be recognized that references to the "invention" will refer to the subject matter recited in one or more, but not necessarily all, of the claims. Each of the inventions will now be described in greater detail below, including specific embodiments, versions, and examples, but the inventions are not limited to these specific embodiments, versions, or examples, which are included to enable a person having ordinary skill in the art to make and use the inventions when the information in this patent is combined with available information and technology. Various terms as used herein are defined below, and the definitions should be adopted when construing the claims that include those terms, except to the extent a different meaning is given within the specification or in express representations to the Patent and Trademark Office (PTO). To the extent a term used in a claim is not defined below or in representations to the PTO, it should be given the broadest definition persons having skill in the art have given that term as reflected in at least one printed publication, dictionary, or issued patent.

The invention claimed is:

1. A power distribution system for crypto mining applications, comprising:
   a housing constructed of galvanized or cold rolled steel;
   a three-phase alternating current input port configured to receive three-phase power from a power source;
   a plurality of power strip sections, each power strip section comprising:
   6 single phase 240 VAC outlets;
   a 45 ampere, three-pole breaker electrically connected to the three-phase input;
   cabling for distributing single phase 240 VAC power to each outlet;
   a 20 ampere, single phase miniature circuit breaker electrically connected to each outlet;
   a hinge to secure each power strip to a mining cabinet;
   at least one steel raceway enclosing power cables, the raceway having:
   a width and depth not exceeding 6 inches;
   holes configured to mount each power strip section securely while sealing the power cable in;
   a terminal block connected to the three phase input, from which cables are connected to the 45 ampere breakers in the power strip sections; a 3 foot service loop in each cable between the terminal block and each power strip; and
   a strain relief securing the cable between the power strip and the raceway.

2. The power distribution system of claim 1, wherein each power strip section has a height not exceeding 4 inches and a length not exceeding 36 inches.

3. The power distribution system of claim 1, wherein the raceway is constructed of cold rolled steel and includes a lifting bracket mounted to a top of the housing.

4. The power distribution system of claim 1, further comprising a bus bar assembly including: a first bus bar configured to connect a first phase input terminal to a first output terminal; a second bus bar configured to connect a second phase input terminal to a second output terminal; and a third bus bar configured to connect a third phase input terminal to a third output terminal.

5. The power distribution system of claim 4, wherein each bus bar is a flat metal strip mounted on insulators within the housing.

6. The power distribution system of claim 1, further comprising a neutral bar and a ground bar electrically connected to the system and secured within the housing.

7. The power distribution system of claim 1, wherein the system includes a breaker panel configured to mount one or more 1-pole or 3-pole circuit breakers.

8. The power distribution system of claim 1, wherein the input power is selected from the group consisting of 240 volts, 415 volts, and 480 volts.

9. The power distribution system of claim 1, further comprising one or more LED pilot lights to indicate power.

10. The power distribution system of claim 1, further comprising a cable isolation assembly including: a bottom isolation barrier constructed of 16 GA metal; a front bottom and top cover constructed of 14 GA metal; and a breaker cover constructed of 16 GA metal.

* * * * *